US012721483B2

(12) United States Patent
Bai

(10) Patent No.: US 12,721,483 B2
(45) Date of Patent: Sep. 1, 2026

(54) DISPENSER SYSTEM WITH MAKEUP AIR

(71) Applicant: Peter Bai, Placentia, CA (US)

(72) Inventor: Peter Bai, Placentia, CA (US)

( * ) Notice: Subject to any disclaimer, the term of this patent is extended or adjusted under 35 U.S.C. 154(b) by 162 days.

(21) Appl. No.: 18/762,449

(22) Filed: Jul. 2, 2024

(65) Prior Publication Data

US 2024/0358202 A1 Oct. 31, 2024

Related U.S. Application Data

(63) Continuation-in-part of application No. 18/308,515, filed on Apr. 27, 2023, now Pat. No. 12,396,599.

(51) Int. Cl.
*A47K 5/14* (2006.01)
*A47K 5/12* (2006.01)
*B05B 7/00* (2006.01)

(52) U.S. Cl.
CPC .............. *A47K 5/14* (2013.01); *A47K 5/1217* (2013.01); *B05B 7/0025* (2013.01)

(58) Field of Classification Search
CPC ...... A47K 5/14; A47K 5/1217; B05B 7/0025; B05B 11/1087
See application file for complete search history.

(56) References Cited

U.S. PATENT DOCUMENTS

2002/0158085 A1* 10/2002 Ophardt .............. B05B 11/1087 222/383.1
2008/0210702 A1* 9/2008 Lochinger ............ A47K 5/1217 206/459.5
2012/0048891 A1* 3/2012 Hagleitner ............... A47K 5/16 222/138
2014/0054322 A1* 2/2014 McNulty ............. B05B 11/1087 222/190
2017/0100001 A1* 4/2017 Tojek ...................... B05B 15/62

* cited by examiner

*Primary Examiner* — Donnell A Long
(74) *Attorney, Agent, or Firm* — Clement Cheng

(57) ABSTRACT

A dispenser system includes a container. The container has a container opening. A dispenser body has a dispenser socket. The dispenser body has a dispensing mode and a waiting mode. An air inlet port and a fluid outlet port are formed on the dispenser socket. An inlet valve and an outlet valve are mounted to an interface assembly. The interface assembly is mounted to the container opening. The inlet valve connects to the air inlet port and the outlet valve connects to the fluid outlet port. The container is mounted to the dispenser socket. An air pump is mounted in the dispenser body. The air pump pumps air to the air inlet port during a dispensing mode.

16 Claims, 8 Drawing Sheets

DISPENSER SYSTEM WITH MAKEUP AIR

FIELD OF THE INVENTION

The present invention is in the field of soap dispenser systems.

BACKGROUND

A variety of different dispenser systems have been designed for dispensing soap such as a foam soap or disinfectant alcohol in bathrooms.

SUMMARY OF THE INVENTION

A dispenser system includes a container. The container has a container opening. A dispenser body has a dispenser socket. The dispenser body has a dispensing mode and a waiting mode. An air inlet port and a fluid outlet port are formed on the dispenser socket. An inlet valve and an outlet valve are mounted to an interface assembly. The interface assembly is mounted to the container opening. The inlet valve connects to the air inlet port and the outlet valve connects to the fluid outlet port. The container is mounted to the dispenser socket. An air pump is mounted in the dispenser body. The air pump pumps air to the air inlet port during a dispensing mode.

The dispenser body is connected to the dispenser wall mount frame. The dispenser wall mount frame has a key opening. The key passes through the key opening to depress a plunger. The plunger depresses a connector yoke. The connector yoke is connected to a right spring arm and a left spring arm. The right spring arm is connected to a right retainer latch. The left spring arm is connected to a left retainer latch. The right retainer latch and the left retainer latch retain the container to the dispenser body.

The connector yoke is connected to a right spring foot and a left spring foot. The right spring foot and the left spring foot biases against the right spring arm and the left spring arm. The right spring arm and the left spring arm are connected to the right retainer latch and the left retainer latch. The dispenser connects to the container. The container has a first slot retainer and a second slot retainer. The first slot retainer connects to a right retainer rail, and a second slot retainer connects to a left retainer rail.

The inlet valve is mounted to an inlet valve retainer formed in an inlet valve opening. The inlet valve opening is formed on the container interface. The outlet valve is mounted to an outlet valve retainer formed in an outlet valve opening. The outlet valve opening is formed on the container interface. The inlet valve and the outlet valve are both formed as elastomeric members that are pressfit to the inlet valve retainer and the outlet valve retainer.

The air pump is configured to pump air to the inlet valve so that the inlet valve provides a makeup air for exiting liquid and exiting liquid exits from the container. An optional liquid pump can extract liquid through a passage tube. A dispenser wall mounted frame is connected to the dispenser body.

Figure 1:
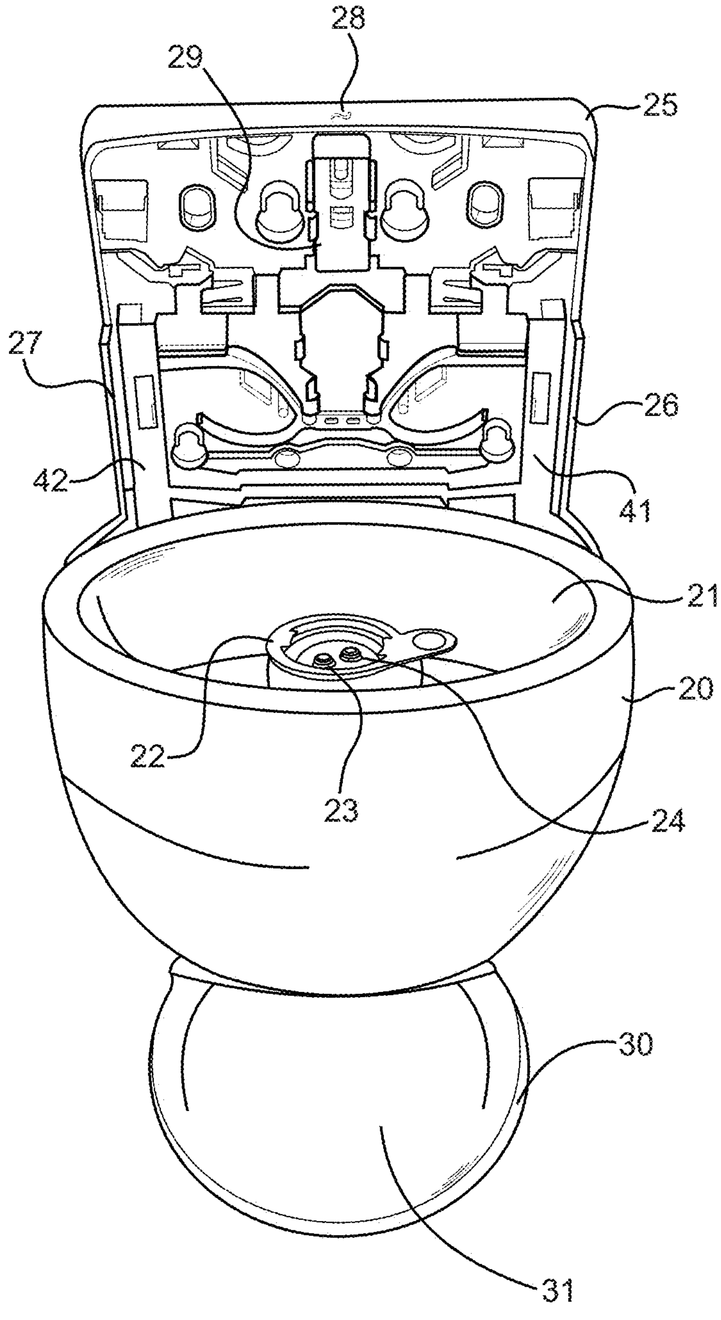
FIG. 1 is a perspective view of the dispenser.

The following call out list of elements can be useful guide in referencing the element numbers of the drawings.

20 dispenser body
21 dispenser socket
22 container outlet retainer
23 air inlet port
24 fluid outlet port
25 dispenser wall mounting frame
26 right retainer rail
26 right retainer rail
27 left retainer rail
28 key opening
29 plunger
30 retainer basin
31 retainer basin hollow
33 dispenser frame edge
34 dispenser frame edge right wall
35 dispenser frame edge left wall
36 dispenser frame edge top wall
41 right retainer latch
42 left retainer latch
51 right spring foot
52 left spring foot
52 spring left foot
53 connecter yoke
54 right spring arm
55 left spring arm
56 right latch
57 left latch
58 right latch point
59 left latch point
60 container
61 container interface
63 first slot retainer
64 second slot retainer
65 container back side
66 first container port
67 container neck
68 container bottom side
69 container top
71 cover
72 cover tab
73 outlet flow valve
74 outlet valve check edge
70 interface assembly
75 outlet valve protrusion mount
76 inlet valve
77 outlet valve mount
78 inlet valve opening
79 adapter round face
80 container interface adapter
81 outlet valve retainer
82 outlet valve opening
83 inlet valve opening
84 inlet valve retainer
85 seal ring
86 container opening
87 container edge 88 neck ring
89 container body wall
91 adapter retainer edge
92 adapter rim
93 adapter outside wall
94 adapter inside wall
95 neck interface
96 outlet valve opening funnel
100 air pump
101 air pump controls
103 dispenser socket frame
105 liquid pump
170 second container port
110 makeup air member
111 electronic controller
112 battery mount
113 first foam pump inlet tube section
114 foam pump outlet tube
115 first foam pump inlet
116 pump outlet tube retainer spring
117 second pump inlet tube retainer spring
118 second pump inlet tube section
119 one way valve
120 makeup air branch
122 makeup air tube inlet valve
123 makeup air member inlet opening
125 first foam pump inlet tube connector
126 dispenser tube connector
127 dispenser tube
130 foam pump
140 outlet nozzle
141 outlet nozzle bracket
142 outlet nozzle bracket frame extension

DETAILED DESCRIPTION OF THE PREFERRED EMBODIMENT

As seen in FIG. 1, the dispenser body 20 has a dispenser socket 21. The dispenser socket 21 receives a container at a container opening. The container opening locks to the fluid outlet port 24 and the air inlet port 23. The container opening connects to the container outlet retainer 22. The container outlet retainer 22 can be formed as a lever or rotating latch.

The container latches to the dispenser wall mounting frame 25. The dispenser wall mounting frame 25 has a right retainer rail 26 and a left retainer rail 27. The right retainer rail retains a right portion of the container and the left retainer rail 27 retains a left portion of the container. The right retainer rail controls a right retainer latch 41 and controls a left retainer latch 42. The right retainer latch 41 latches to a right portion of the container and the left retainer latch 42 latches to a left portion of the container. The dispenser body 20 further includes a retainer basin 30. The retainer basin 30 has a retainer basin hollow 31. The retainer basin 30 is below the dispenser body 20 and catches any overflow soap and bubbles. The dispenser body 20 is mounted to the dispenser wall mounting frame 25 and the dispenser wall mounting frame 25 is mounted to a wall in a vertical orientation. The dispenser wall mounted frame has a key opening 28 for receiving a key. The key presses down on a plunger 29 which then interacts with a mechanism that releases the right retainer latch 41 on the right retainer rail 26 and also releases the left retainer latch 42 on the left retainer rail 27.

Figure 2:
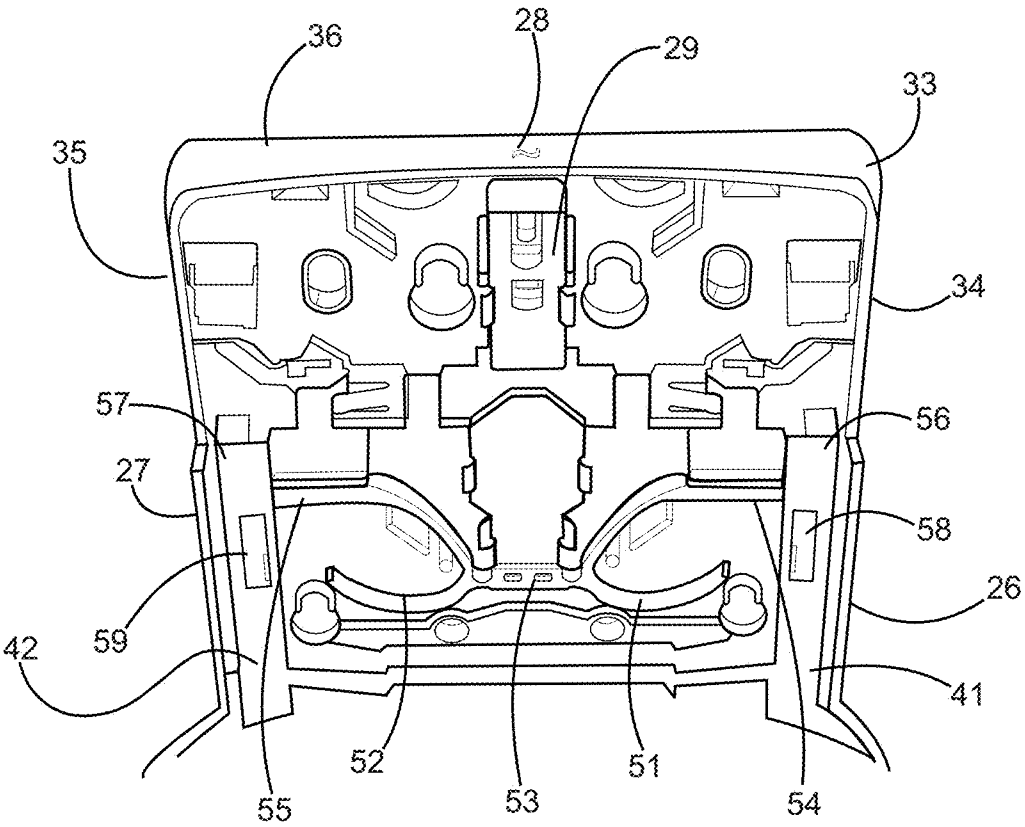
FIG. 2 is a perspective view of the dispenser frame.

As seen in the FIG. 2, the dispenser wall mounting frame 25 has a dispenser frame edge 33 which forms a dispenser frame edge right wall 34 and a dispenser frame edge left wall 35. The dispenser frame edge top wall 36 is continuous with the dispenser frame edge right wall 34 and the dispenser frame edge left wall 35 to form a rigid frame. The dispenser frame edge right wall and the dispenser frame edge left wall and the dispenser frame edge top wall define a hollow flat area for a release mechanism which includes the key opening 28 that presses a plunger 29. When actuated, the plunger moves from an upper position to a lower position. When in the lower position, the plunger 29 presses on a connector yoke 53. The connector yoke 53 is resiliently connected to a right spring foot 51 and a left spring foot 52. Preferably, the right spring foot 51 and the left spring foot 52 are leaf springs such as a leaf springs made of plastic, but can also be helical metal springs. The connector yoke 53 also connects to a left spring arm 55 and a right spring arm 54. The right spring arm 54 connects to the right latch 56, and the left spring arm 55 connects to the left latch 57. The right spring arm and the left spring arm pulldown the latches to release the latches from the container. The latches connect to the container at a right latch point 58 and a left latch point 59.

The right spring foot 51 and the left spring foot 52 bias against the dispenser frame and provide an upward bias to the right spring arm 54 and the left spring arm 55. The right spring arm 54 and the left spring arm 55 connect outwardly to the right latch 56 and the left latch 57 upwardly from the connector yoke 53. When the plunger 29 presses down on the connector yoke 53, the connector yoke 53 pulls down the right spring arm 54 and the left spring arm 55 which in turn pulls down the right retainer latch 41 and the left retainer latch 42 which disengages the right latch 56 and the left latch 57 from the container at the right latch point 58 and the left latch point 59.

Figure 3:
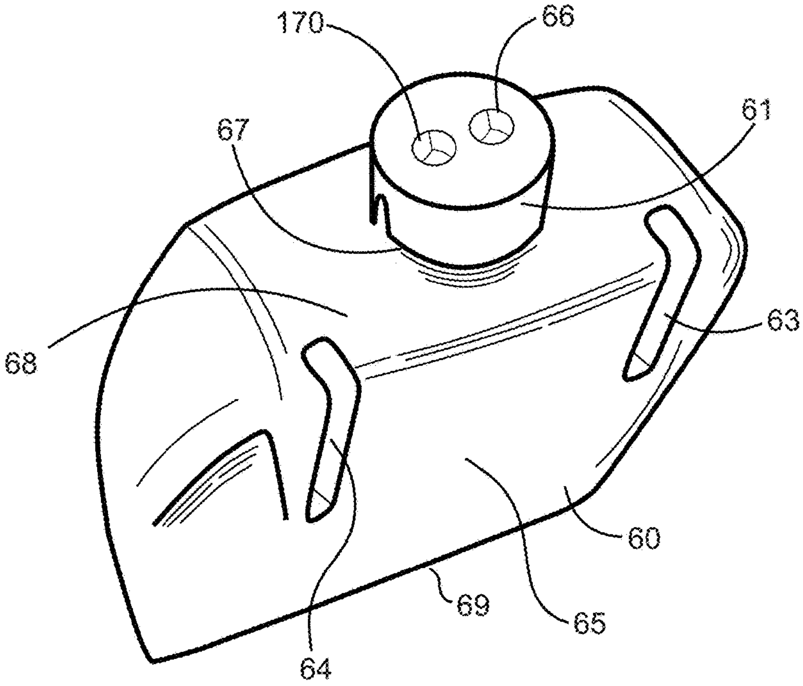
FIG. 3 is a perspective view of the container.

As seen in the FIG. 3, the container interface 61 is formed at a container neck 67. The container 61 has a first container port 66 and the second container port 170. The container 60 has a first slot retainer 63 and a second slot retainer 64. The first slot retainer 63 connects to the right retainer rail 26 and latches to the right retainer latch 41 at the right latch. 58. The second slot retainer 64 connects to the left retainer rail 27 at the left retainer latch 57 at the left latch. 59. The container 60 has a container backside 69 that faces the dispenser frame. The container backside 65 has a first slot retainer 63 and a second slot retainer 64 that extends from the container backside 65 to the container bottom side 68. The container bottom side is opposite the container topside 69.

Figure 4:
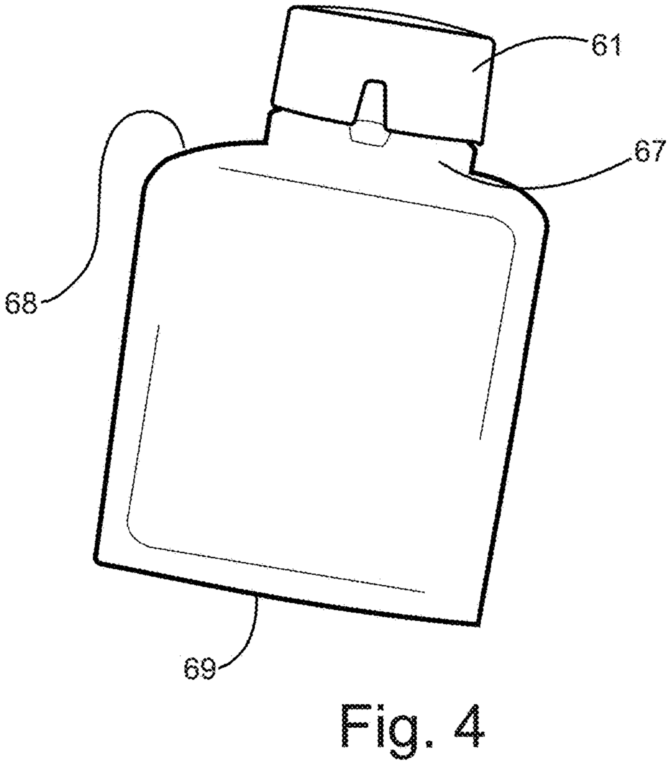
FIG. 4 is a side view of the container.

As seen in FIG. 4, the container interface snaps to the container neck 67 and can be made nonremovable. The container bottom side 68 can form a container shoulder. The container topside 69 can be a flat surface.

Figure 5:
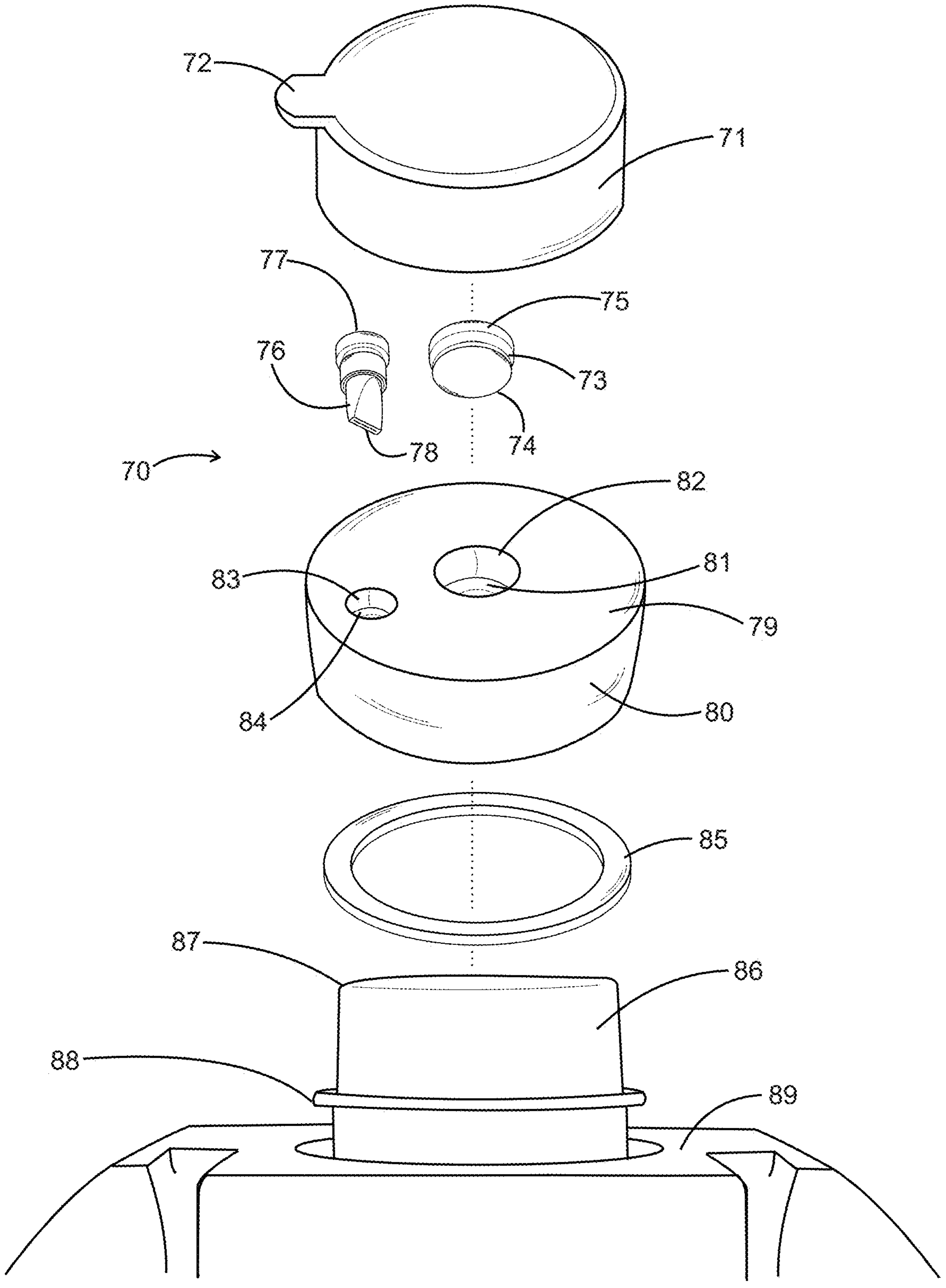
FIG. 5 is an exploded view of the interface assembly of the container.

As seen in FIG. 5, the container interface adapter 80 has an inlet valve opening 83 and the outlet valve opening 82. The inlet valve opening 83 may allow air to leak into the container, while the outlet valve opening may allow liquid to exit from the container. The interface assembly 70 has a container interface adapter 80 with an adapter around face 79. The inlet valve opening 83 and the outlet valve opening 82 are formed on the adapter around face 79. The inlet valve opening 83 has an inlet valve retainer 84 and the outlet valve opening 82 has an outlet valve retainer 81. The valve retainers can be recessed annular slots that receive protrusion is on the inlet valve 76 and the outlet flow valve 73.

For example, the inlet valve 76 may have an outlet valve mount 77 formed as an annular protrusion around the inlet valve 76. The inlet valve opening 78 may allow air to enter the container while not allowing liquid to exit. For example, the inlet valve opening 78 can be formed as a rubber slot to allow air to leak in order to be pumped in which displaces the liquid within and forces the liquid to be purged through the outlet valve such as the outlet flow valve 73. The outlet flow valve 73 has an outlet valve protrusion mount 75 which is mounted to the outlet valve retainers 81. The outlet valve protrusion mount 75 can be formed as an annular protrusion around the outlet flow valve 73. When the liquid exits the outlet flow valve 73, the liquid can exit at the outlet valve check edge 74. The outlet valve check edge 74 forms a watertight seal when not under internal pressure. Internal pressure can be increased such as when air is pumped through the inlet valve opening 78.

The container interface adapter 80 has a seal ring 85 which seals the container interface adapter 82 the container edge 87. The container edge 87 is formed at the container opening 86. The container opening 86 may further include one or more neck ring 88 near the container body wall 89. During transportation, a cover 71 with a cover tab 72 may cover the container interface adapter 80.

Figure 6:
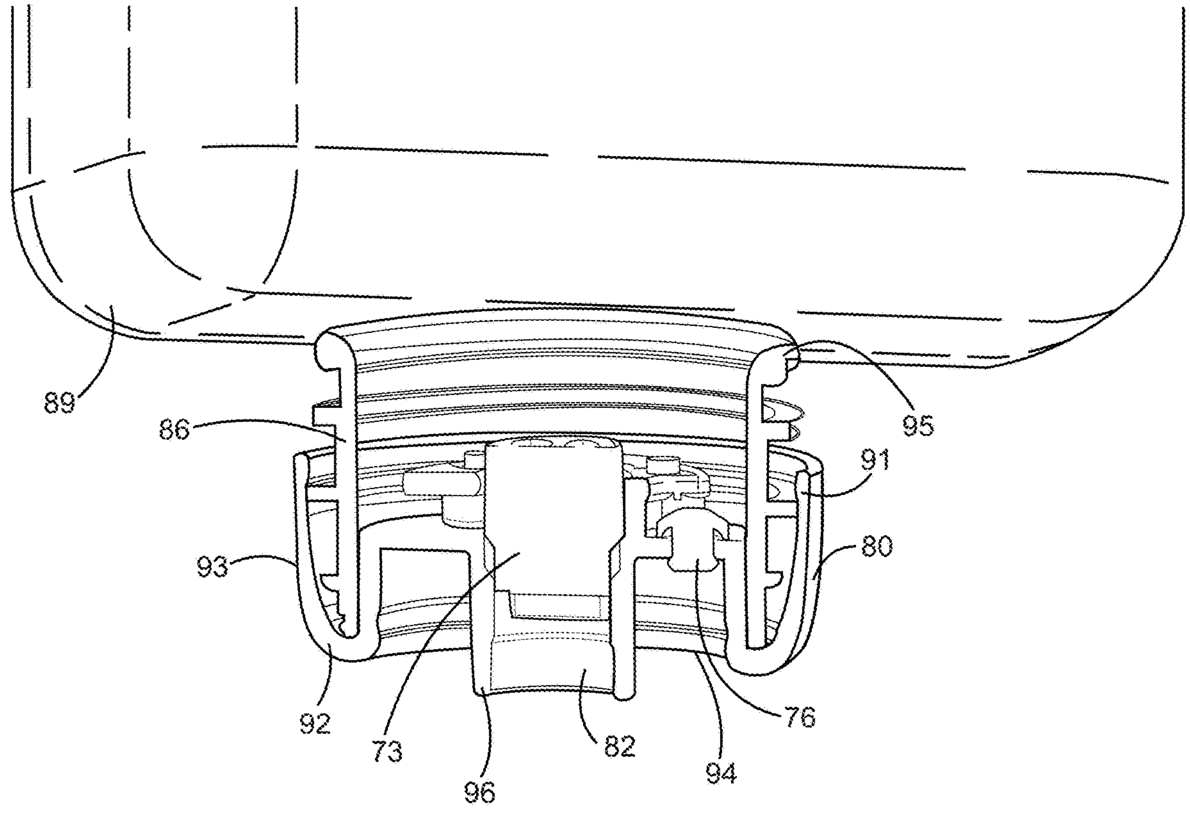
FIG. 6 is a cross-section of the interface assembly of the container.

As seen in FIG. 6, the container interface adapter 80 may have an adapter retainer edge 91 which secures to the neck ring 88 to provide a permanent secure attachment. The adapter retainer edge 91 can have a 90° corner that secures to the neck ring 88.

The adapter retainer edge 91 is formed on the adapter outside wall 93. The adapter outside wall 93 and the adapter inside wall 94 sandwich the container edge 87 and the container opening 86. The adapter inside wall continues to form an adapter rim 92 which connects the adapter outside wall 93 to the adapter inside wall 94. The outlet valve opening funnel 96 is parallel to the adapter inside wall 94, which in turn is parallel to the adapter outside wall 93. The outlet valve opening funnel 96 is preferably lower than a level of the adapter ring 92. The neck interface 95 can be formed to the container body wall 89. The container opening 86 thus has flow regulation.

Figure 7:
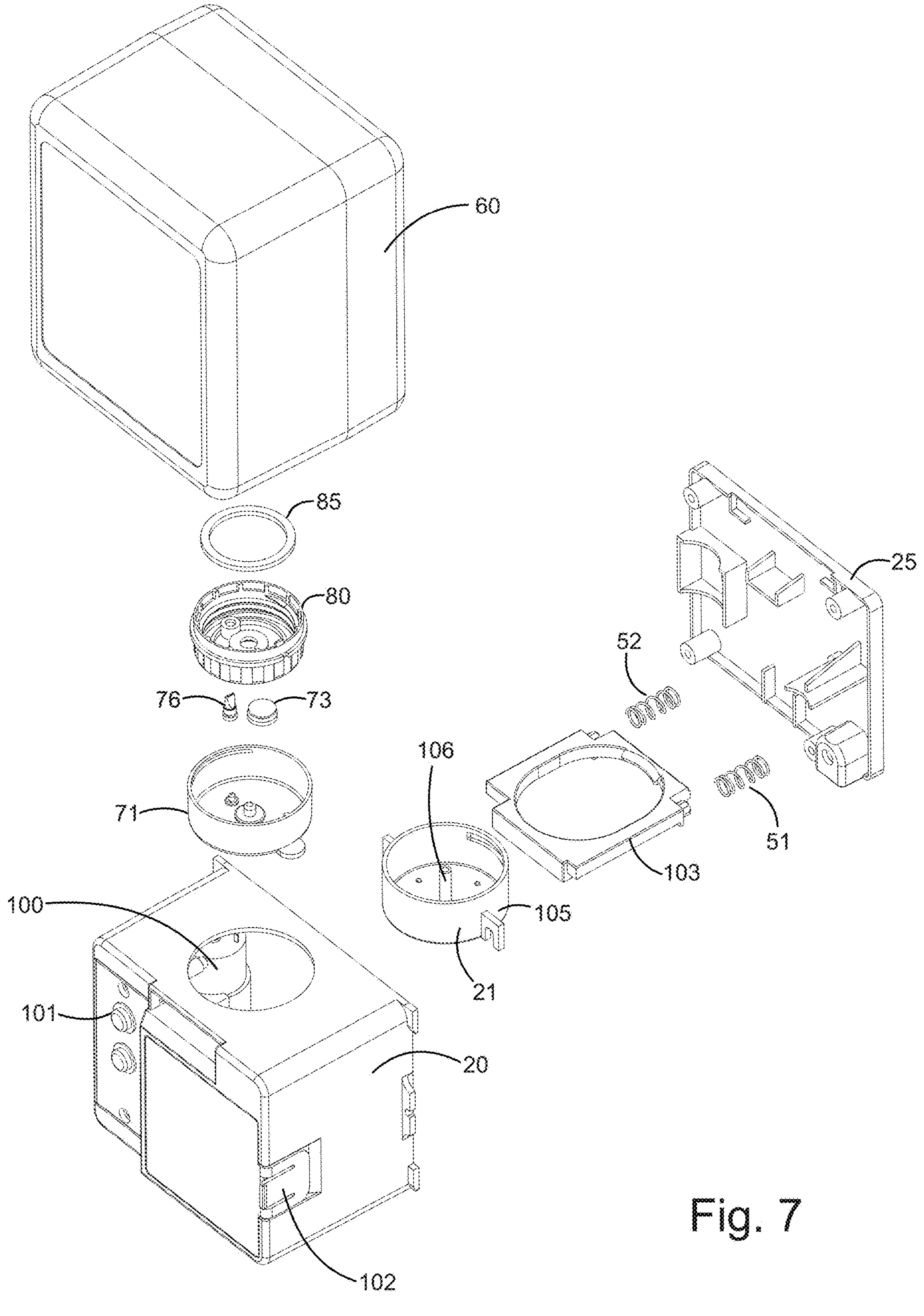
FIG. 7 is an exploded view of the present invention.

As seen in FIG. 7, the container 60 fits to the seal ring 85 which fits to the container interface adapter 80. The container interface adapter 80 has an inlet valve 76 and an outlet valve 73 controlling the flow rate of the container 60. After removing the lid 71, the container 60 fits to the dispenser socket 21. The dispenser socket 21 can be mounted to a dispenser socket frame 103 which is then mounted to the dispenser frame. The dispenser body 20 has an air pump 100 that pumps air through the dispenser socket 21. A passage tube 106 on the dispenser socket 21 can receive liquid flow and pump it to the dispenser body outlet at a lower portion of the dispenser. The air pump 100 also preferably has air pump controls 101 to allow air modal control. The air pump 100 can be powered by an air pump battery 102. The container interface 61 may fit in an airtight configuration to the container outlet retainer 22 or the dispenser socket 21. Thus, the container interface 61 may allow the air pump 100 to pressurize the area outside the inlet valve 76 which pumps air into the inlet valve 76. When the air enters into the inlet valve 76 may displace liquid which is then pumped out of the container. Accordingly, makeup air is used for pumping out the liquid. The liquid can also be pumped out using a liquid pump 105 which cooperates with the air pump.

Figure 8:
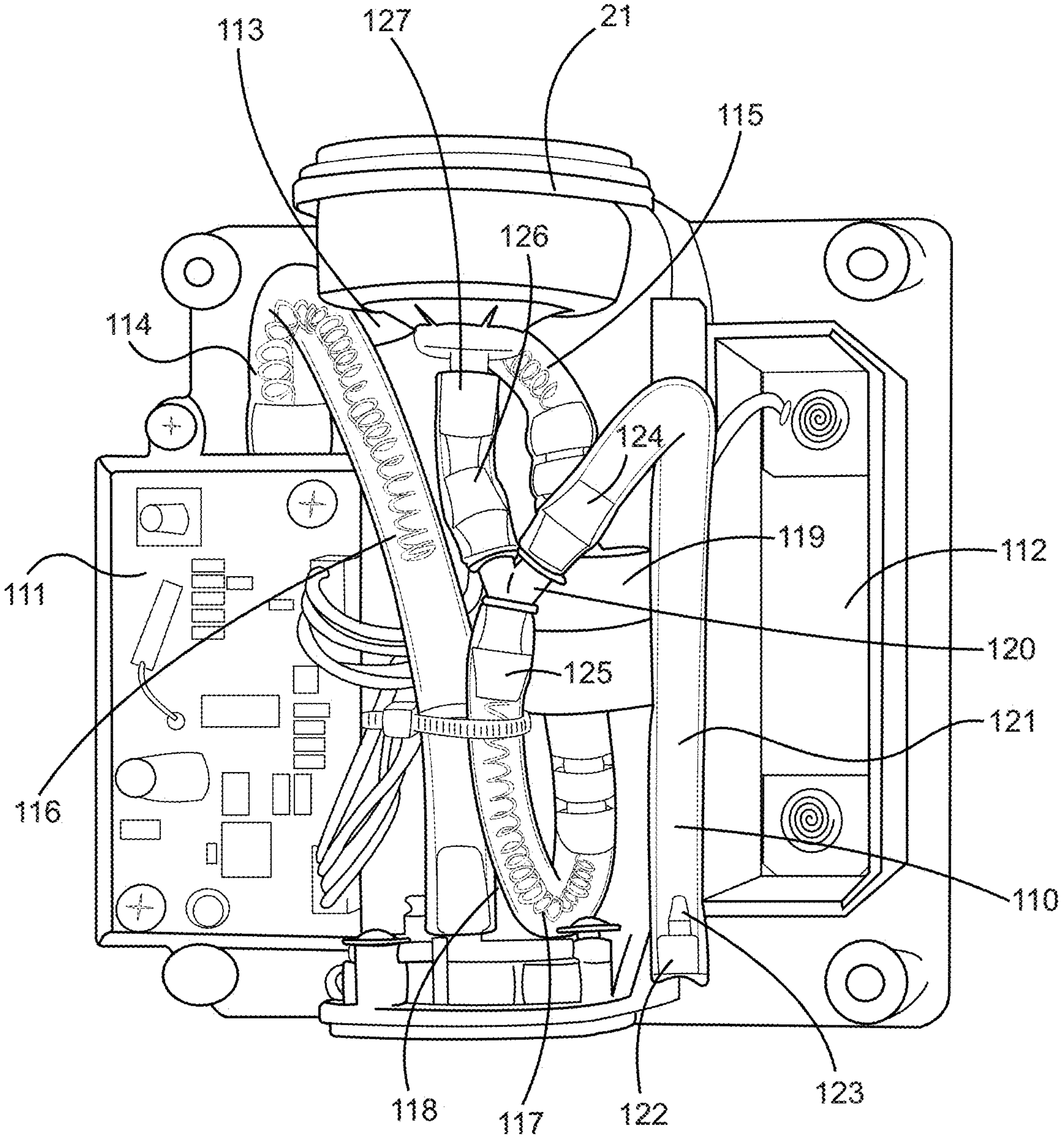
FIG. 8 is a front view diagram of the present invention with a makeup air member.
Figure 9:
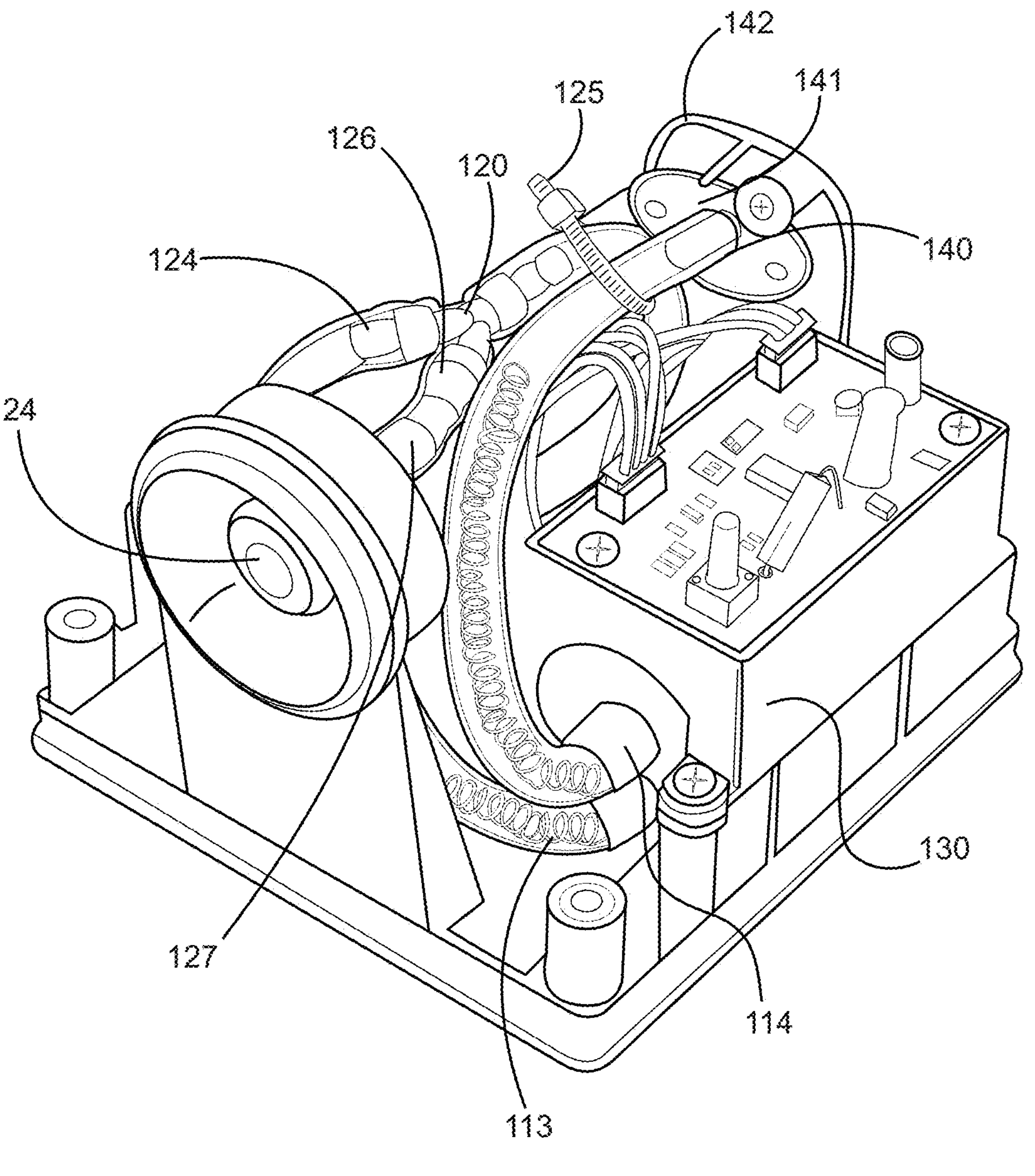
FIG. 9 is a top left view diagram of the present invention with a makeup air member.

As seen in FIGS. 8-9, the present invention can have the air inlet and liquid outlet of the container merged into a single outlet opening. The single outlet opening can be connected to the dispenser tube 127. Then the air inlet and liquid outlet branch off at a makeup air branch 120 where the makeup air member 110 is the air inlet and the liquid outlet branch connects at a second pump inlet tube section 118.

The dispenser socket 21 receives fluid from a fluid container and passes the fluid to and inlet tube. The inlet tube has a makeup air branch 120. The makeup air branch 120 has a connection to the makeup air tube 121. The makeup air tube 121 is a makeup air member 110. The makeup air tube inlet valve 122 admits a small amount of air through a small constriction at the makeup air member inlet opening 123. The makeup air passes through the makeup air tube 121 and into the makeup air branch 120. The makeup air branch 120 then passes air into the dispenser tube 127. The makeup air passes from the dispenser tube 127 through the dispenser socket 21 and into the container so that the container pressure is equalized.

As soap liquid exits from the dispenser tube 127, it passes the makeup air tube 121 at the makeup air branch 120. The makeup air branch 120 is also connected to the second pump inlet tube section 118. The second pump inlet tube section 118 has a second pump inlet tube retainer spring 117. The retainer spring prevents crimping of the tube when the tube has a bend. Retainer springs are helical and inserted into the tube lengthwise such that liquid is passing through the helical spring.

The electronic controller 111 controls the foam pump which draws soap liquid from the first foam pump inlet tube section 113 and outputs foam to the foam pump outlet tube 114. The first foam pump inlet tube section 113 has a first foam pump inlet tube retainer spring 115. Similarly, the foam pump outlet tube 114 has a pump outlet tube retainer spring 116. The foam pump outlet tube 114 has a downward bend and the first foam pump inlet tube section 113 also has a downward bend. Both of these downward bends are not crimped due to the tube retainer springs inserted coaxially within the tubes. The tubes can be soft elastomeric members. The first foam pump inlet tube section 113 connects to a one-way valve 119 and the one-way valve 119 connects to the second pump inlet tube section 118. The second pump inlet tube section 118 has a second pump inlet tube retainer spring 117 inserted because the second pump inlet tube section 118 has an upward bend. The one-way valve 119 allows passage of soap liquid from the second pump inlet tube 118 to the first foam pump inlet tube section 113.

The battery mount 112 can be mounted parallel to the makeup air member 110. The makeup air branch 120 has a dispenser tube connector 126 that connects to the dispenser tube 127, and has a makeup air tube connector 124 that connects to the makeup air tube 121, and has a first foam pump inlet tube connector 125 that connects to the second pump inlet tube section 118. The first pump inlet tube section and the second pump inlet tube section together form the inlet tube. The inlet tube passes from the makeup air branch 122 the foam pump 130. The foam pump 130 pumps mostly liquid, and sometimes some air bubbles. The foam pump 130 passes liquid through the outlet nozzle 140. The outlet nozzle 140 is mounted on the outlet nozzle bracket 141. The outlet nozzle bracket 141 may have a foam generator such as screens, and the outlet nozzle bracket can be mounted on the outlet nozzle bracket frame extension 142. Thus, the foam pump 130 creates foam by pumping liquid and air through the outlet nozzle 140. The outlet nozzle 140 may have screens that mix the liquid and air to make foam.

The invention claimed is:

1. A dispenser system comprising: a container, wherein the container includes a container opening; a dispenser body, wherein the dispenser body includes a dispenser socket, wherein the dispenser body has a dispensing mode and a waiting mode; a fluid outlet port, wherein the fluid outlet port is formed on the dispenser socket; a dispenser tube, wherein the dispenser tube is connected to the dispenser socket, wherein the dispenser tube receives soap liquid from the container; an air inlet port, wherein the air inlet port is connected to the dispenser tube at a makeup air branch; an inlet valve and an outlet valve, wherein the inlet valve and outlet valve are mounted to an interface assembly, wherein the interface assembly is mounted to the container opening; a one-way valve disposed in the dispenser tube between the makeup air branch and the foam pump; and a foam pump mounted in the dispenser body, wherein the foam pump pumps liquid to an outlet nozzle during a dispensing mode.

2. The dispenser system of claim 1, further comprising: a dispenser wall mounted frame, wherein the dispenser body is connected to the dispenser wall mount frame, wherein the air inlet port is formed as a makeup air tube that is connected to the makeup air branch, wherein the makeup air tube has a makeup air tube inlet valve.

3. The dispenser system of claim 2, wherein the dispenser wall mounted frame has a key opening, wherein a key passes through the key opening to depress a plunger, wherein the plunger depresses a connector yoke, wherein the connector yoke is connected to a right spring arm and a left spring arm, wherein the right spring arm is connected to a right retainer latch, wherein the left spring arm is connected to a left retainer latch, wherein the right retainer latch and the left retainer latch retain the container to the dispenser body, wherein the right retainer latch engages a first slot retainer on the container and the left retainer latch engages a second slot retainer on the container.

4. The dispenser system of claim 3, wherein the connector yoke is connected to a right spring foot and a left spring foot, wherein the right spring foot and the left spring foot biases against the right spring arm and the left spring arm, wherein the right spring arm and the left spring arm are connected to the right retainer latch and the left retainer latch, wherein the right spring foot and the left spring foot bias against the dispenser wall mounting frame, and wherein the connector yoke connects the right spring foot, the left spring foot, the right spring arm, and the left spring arm at a single junction.

5. The dispenser system of claim 3, wherein the dispenser body connects to the container, wherein the container has a first slot retainer and a second slot retainer, wherein the first slot retainer connects to a right retainer rail, and wherein a second slot retainer connects to a left retainer rail, wherein the first slot retainer and the second slot retainer each extend from a container backside to a container bottom side.

6. The dispenser system of claim 1, wherein the inlet valve is mounted to an inlet valve retainer formed in an inlet valve opening, wherein the inlet valve opening is formed on the container interface, wherein the outlet valve is mounted to an outlet valve retainer formed in an outlet valve opening, wherein the outlet valve opening is formed on the container interface, wherein the outlet valve has an outlet valve check edge that forms a watertight seal when the outlet valve is not under internal pressure, and wherein the inlet valve opening is formed as a rubber slot configured to admit air into the container.

7. The dispenser system of claim 1, wherein the inlet valve and the outlet valve are both formed as elastomeric members that are press-fit to the inlet valve retainer and the outlet valve retainer, wherein the interface assembly includes a container interface adapter having a seal ring that seals the container interface adapter to a container edge at the container opening, and wherein the container interface adapter has an adapter inside wall and an adapter outside wall that sandwich the container edge at the container opening.

8. The dispenser system of claim 1, further including an air pump, wherein the air pump is configured to pump air to the inlet valve, wherein the inlet valve provides a makeup air for exiting liquid, wherein exiting liquid exits from the container, wherein the interface assembly fits in an airtight configuration to the dispenser socket to allow the air pump to pressurize an area outside the inlet valve, and wherein the pressurized area pumps air through the inlet valve to displace liquid from the container.

9. The dispenser system of claim 1, further including a liquid pump, wherein the liquid pump extracts liquid through a passage tube, wherein the liquid pump cooperates with the air pump to extract liquid from the container.

10. The dispenser system of claim 1, further comprising: a dispenser wall mounted frame, wherein the dispenser body is connected to the dispenser wall mount frame, wherein the dispenser body includes a retainer basin below the dispenser socket, wherein the retainer basin includes a retainer basin hollow to catch overflow soap.

11. The dispenser system of claim 10, further comprising: a dispenser wall mounted frame, wherein the dispenser body is connected to the dispenser wall mount frame, wherein the dispenser wall mounted frame has a key opening, wherein a key passes through the key opening to depress a plunger, wherein the plunger depresses a connector yoke, wherein the connector yoke is connected to a right spring arm and a left spring arm, wherein the right spring arm is connected to a right retainer latch, wherein the left spring arm is connected to a left retainer latch, wherein the right retainer latch and the left retainer latch retain the container to the dispenser body, wherein the connector yoke is connected to a right spring foot and a left spring foot, wherein the right spring foot and the left spring foot biases against the right spring arm and the left spring arm, wherein the right spring arm and the left spring arm are connected to the right retainer latch and the left retainer latch, wherein the dispenser tube comprises a first pump inlet tube section and a second pump inlet tube section, wherein the first pump inlet tube section has a first pump inlet tube retainer spring inserted coaxially within the first pump inlet tube section, and wherein the second pump inlet tube section has a second pump inlet tube retainer spring inserted coaxially within the second pump inlet tube section.

12. The dispenser system of claim 11, wherein the dispenser body connects to the container, wherein the container has a first slot retainer and a second slot retainer, wherein the first slot retainer connects to a right retainer rail, and wherein a second slot retainer connects to a left retainer rail, wherein the outlet nozzle is mounted on an outlet nozzle bracket, wherein the outlet nozzle bracket has a foam generator, and wherein the outlet nozzle bracket is mounted on an outlet nozzle bracket frame extension.

13. The dispenser system of claim 11, wherein the inlet valve is mounted to an inlet valve retainer formed in an inlet valve opening, wherein the inlet valve opening is formed on the container interface, wherein the outlet valve is mounted to an outlet valve retainer formed in an outlet valve opening, wherein the outlet valve opening is formed on the container interface, wherein the container interface adapter has an adapter rim that connects an adapter inside wall to an adapter outside wall, and wherein the container interface adapter has an outlet valve opening funnel that is parallel to the adapter inside wall and is positioned lower than the adapter rim.

14. The dispenser system of claim 11, wherein the inlet valve and the outlet valve are both formed as elastomeric members that are press-fit to the inlet valve retainer and the outlet valve retainer, wherein the right spring foot and the left spring foot are leaf springs, and wherein the dispenser wall mounting frame has a dispenser frame edge that forms a dispenser frame edge right wall, a dispenser frame edge left wall, and a dispenser frame edge top wall that together define a hollow flat area, wherein the key opening is formed in the hollow flat area.

15. The dispenser system of claim 11, further including an air pump, wherein the air pump is configured to pump air to the inlet valve, wherein the inlet valve provides a makeup air for exiting liquid, wherein exiting liquid exits from the container, wherein the makeup air branch has a dispenser tube connector connected to the dispenser tube, a makeup air tube connector connected to the makeup air tube, and a pump inlet tube connector connected to a pump inlet tube section, wherein the makeup air branch forms a three-port junction connecting the dispenser tube, the makeup air tube, and the pump inlet tube section.

16. The dispenser system of claim 11, further including a liquid pump, wherein the liquid pump extracts liquid through a passage tube, wherein a battery mount is mounted parallel to the makeup air tube, and wherein an electronic controller controls the foam pump to draw soap liquid from the dispenser tube to the outlet nozzle.

* * * * *